US010193720B1

(12) United States Patent
Anderson et al.

(10) Patent No.: US 10,193,720 B1
(45) Date of Patent: Jan. 29, 2019

(54) CHAOTICALLY MODULATED COMMUNICATIONS WITH SWITCHED-CAPACITANCE RESISTANCE TUNING

(71) Applicant: The United States of America, as represented by the Secretary of the Army, Washington, DC (US)

(72) Inventors: Breijha Anderson, Sicklerville, NJ (US); John Suarez, Brooklyn, NY (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/720,404

(22) Filed: Sep. 29, 2017

(51) Int. Cl.
*H04L 9/00* (2006.01)
*H04L 27/00* (2006.01)
*H04L 27/227* (2006.01)
*H04L 27/233* (2006.01)
*H04L 9/38* (2006.01)

(52) U.S. Cl.
CPC ............ *H04L 27/001* (2013.01); *H04L 9/001* (2013.01); *H04L 9/38* (2013.01); *H04L 27/2271* (2013.01); *H04L 27/2331* (2013.01)

(58) Field of Classification Search
USPC ............... 375/216, 218, 219, 220, 222, 240, 375/240.26, 259, 285, 295, 316, 320, 300, 375/301, 321
See application file for complete search history.

(56) References Cited

U.S. PATENT DOCUMENTS

| | | | | | |
|---|---|---|---|---|---|
| 5,321,409 | A | * | 6/1994 | Walker | G01S 13/288 342/132 |
| 6,349,116 | B1 | * | 2/2002 | Hash | G01V 15/00 375/258 |
| 7,076,065 | B2 | * | 7/2006 | Sherman | H04L 9/001 380/263 |
| 7,119,640 | B2 | * | 10/2006 | Gandhi | H03F 1/34 333/216 |
| 7,593,531 | B2 | * | 9/2009 | Lau | H04B 1/69 380/263 |
| 7,738,576 | B2 | * | 6/2010 | Kim | H04L 27/001 375/219 |
| 7,839,939 | B2 | * | 11/2010 | Lee | H04L 27/001 375/140 |

(Continued)

OTHER PUBLICATIONS

Taylor, Robert LV, "Attractors: nonstrange to chaotic." Society for Industrial and Applied Mathematics, Undergraduate Research Online (2005): 72-80.

(Continued)

*Primary Examiner* — Linda Wong
(74) *Attorney, Agent, or Firm* — Ronald Krosky; Azza Jayaprakash

(57) ABSTRACT

Various embodiments are described that relate to a switched-capacitor in a chaotically modulated communication device. For one chaotically modulated communication device to communicate with another chaotically modulated communication device, the devices should be finely tuned with one another. To achieve this fine tuning, the devices can employ a switched-capacitor set that can function as a variable resistor set. Employing the switched-capacitor set can cause achievement of precise resistances that allow the devices to successfully communicate with one another.

20 Claims, 18 Drawing Sheets

(56) References Cited

U.S. PATENT DOCUMENTS

| | | | | |
|---|---|---|---|---|
| 8,044,701 | B1* | 10/2011 | Greenberg | H03J 1/00 |
| | | | | 327/337 |
| 8,781,031 | B2* | 7/2014 | Casagrande | H04L 27/1525 |
| | | | | 375/334 |
| 9,335,401 | B2* | 5/2016 | Chang | G01S 7/03 |
| 9,403,021 | B2* | 8/2016 | Dronov | A61N 1/37223 |
| 9,762,282 | B1* | 9/2017 | Muellner | G06K 19/0723 |
| 9,819,349 | B2* | 11/2017 | Hiebert | H03B 5/1256 |
| 2002/0077710 | A1* | 6/2002 | Harrington | G01V 15/00 |
| | | | | 700/13 |
| 2007/0195860 | A1* | 8/2007 | Yang | G01S 5/0205 |
| | | | | 375/130 |
| 2008/0008320 | A1* | 1/2008 | Hinton, Sr. | H04L 27/001 |
| | | | | 380/263 |
| 2010/0141225 | A1* | 6/2010 | Isham | H02M 3/156 |
| | | | | 323/282 |
| 2012/0250783 | A1* | 10/2012 | Terry | H04J 13/0018 |
| | | | | 375/295 |
| 2013/0328638 | A1* | 12/2013 | Chang | H03L 7/00 |
| | | | | 331/36 R |
| 2014/0064410 | A1* | 3/2014 | Swarup | H04L 27/001 |
| | | | | 375/300 |
| 2014/0191810 | A1* | 7/2014 | Hwang | H03L 7/00 |
| | | | | 331/16 |
| 2016/0099681 | A1* | 4/2016 | Zong | H03B 5/1215 |
| | | | | 331/117 FE |
| 2017/0085220 | A1* | 3/2017 | Taghivand | H03B 5/1215 |
| 2017/0310277 | A1* | 10/2017 | Han | H03B 5/1212 |
| 2017/0331482 | A1* | 11/2017 | Djahanshahi | H03B 1/00 |
| 2017/0373782 | A1* | 12/2017 | Swarup | H04J 13/0018 |
| 2018/0040939 | A1* | 2/2018 | Rokhsaz | H01Q 5/335 |
| 2018/0294681 | A1* | 10/2018 | Bae | H02J 50/80 |

OTHER PUBLICATIONS

Matsumoto, Takashi, "A chaotic attractor from Chua's circuit." IEEE Transactions on Circuits and Systems 31.12 (1984): 1055-1058.

Chua, et al., "The double scroll family." IEEE transactions on circuits and systems 33.11 (1986): 1072-1118.

Matsumoto, et al., "The double scroll." IEEE Transactions on Circuits and Systems 32.8 (1985): 797-818.

Zhong, et al., "A systematic approach to generating n-scroll attractors." International Journal of Bifurcation and Chaos 12.12 (2002): 2907-2915.

Corron, et al., "A new approach to communications using chaotic signals." IEEE Transactions on circuits and systems I: Fundamental theory and applications 44.5 (1997): 373-382.

Pecora, et al., "Synchronization in chaotic systems." Physical review letters 64.8 (1990): 821-824.

Al-Hussaibi, Walid A., "Impact of filtering chaotic signals on secure wireless communication systems based Chua's circuit." Innovations in Information Technology (IIT), 2013 9th International Conference on. IEEE, 2013.

\* cited by examiner

CHAOTICALLY MODULATED COMMUNICATIONS WITH SWITCHED-CAPACITANCE RESISTANCE TUNING

GOVERNMENT INTEREST

The innovation described herein may be manufactured, used, imported, sold, and licensed by or for the Government of the United States of America without the payment of any royalty thereon or therefor.

BACKGROUND

Wireless communication can allow for one device to communicate with another device. In one example, cellular telephones can enable two people to have a conversation with one another. While in many circumstances, communication between devices can be ordinary, at times the communication can be sensitive in nature. Therefore, it can be beneficial for the devices to be able to securely communicate with one another.

SUMMARY

In one embodiment, a chaotically modulated communication device comprises a capacitor comprising a first end and a second end opposite the first end. The device also comprises a switch comprising a first end and a second end. The first end of the switch can be coupled to the first end of the capacitor. The second end of the switch can alternate at a frequency between at least two points such that a resistance is produced. The resistance can correspond to the frequency.

In another embodiment, a method can be performed, at least in part, by a first chaotically modulated communication device configuration apparatus. The method can comprise identifying a switching frequency value for a switched-capacitor that is part of the first chaotically modulated communication device. The method can also comprise causing a switching frequency for the switched-capacitor to be implemented with the switching frequency value such that the first chaotically modulated communication device is communicative with a specific second chaotically modulated communication device.

In yet another embodiment, a method can be performed, at least in part, by a chaotically modulated communication device synchronization apparatus. The method can comprise selecting a first switching value set for a switched-capacitor set of a chaotically modulated transmitter and selecting a second switching value set for a switched-capacitor set of a chaotically modulated receiver. The selection of the first switching value set and the selection of the second switching value set can be such that the chaotically modulated transmitter and the chaotically modulated receiver are synchronized so that the chaotically modulated receiver is configured to successfully demodulate a modulated transmission from the chaotically modulated transmitter.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
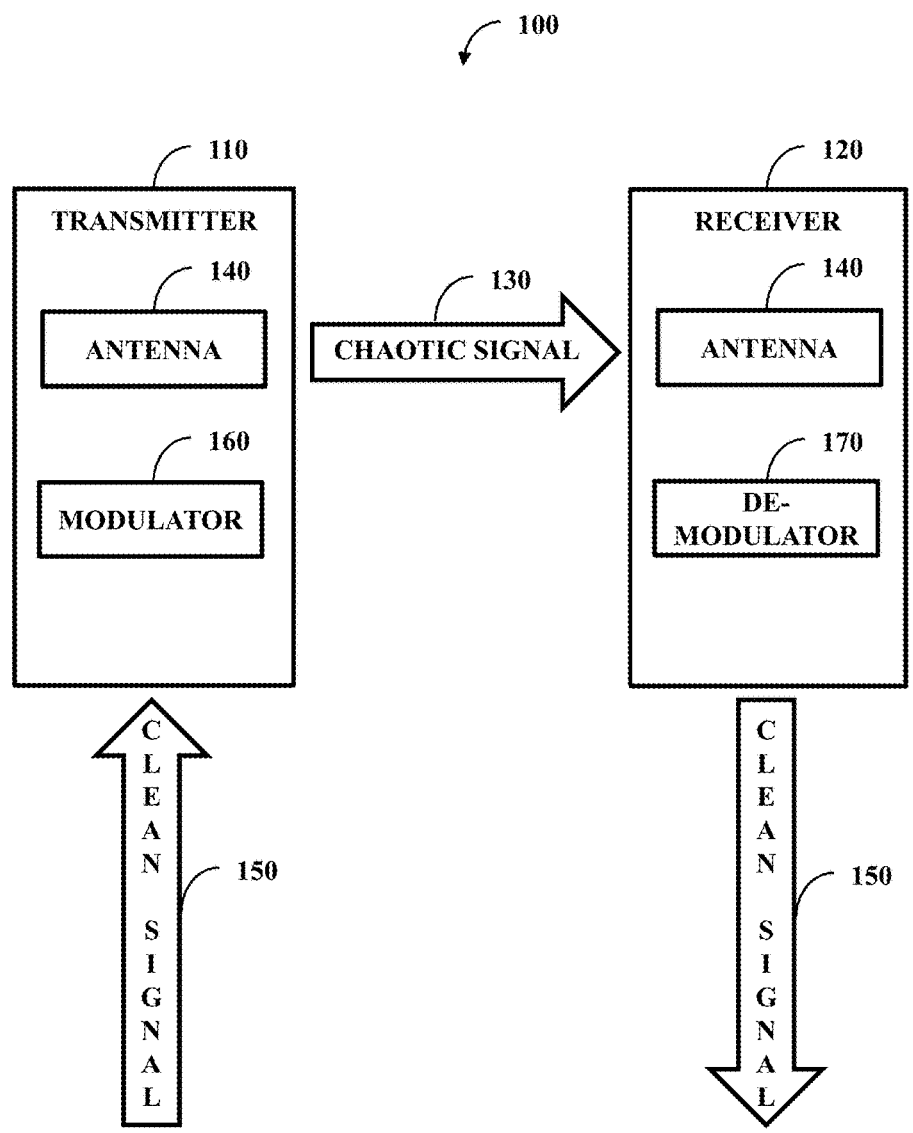
FIG. 1 illustrates one embodiment of a system comprising a transmitter and a receiver.

In one embodiment, two chaotically modulated communication devices can be configured communicate with one another. In chaos theory, small changes to the initial conditions of a system can have dramatic effects on the end results. In signal communications, a signal is modulated and then transmitted by a transmitter. This modulation can be performed by hardware elements, such as resistors. A receiver can receive the transmitted signal and demodulate the signal. If the receiver is not finely tuned to the transmitter, the modulated signal will not be able to be successfully demodulated, and therefore the signal will be indistinguishable from noise. Therefore, the transmitter and receiver are synchronized.

For synchronization to be achieved, the electrical parameters of the transmitter and receiver should be matched within a very small tolerance. Synchronization is when the values of a receiver's circuit components and the values of a transmitter's circuit components are such that the electrical parameters of the transmitter and receiver are the same, and thus allows for the receiver to successfully demodulate the transmitted signal. If the values of electrical parameters of the receiver are such that the transmitter and receiver are not synchronized—even slightly outside allowable tolerance—then the transmitted signal is undecipherable by the receiver due to chaos theory.

However, achieving actual synchronization can be difficult. When variable resistors are used to match the receiver to the transmitter, precision and accuracy of the values of the receiver resistor set is paramount. In one embodiment, potentiometers can be used as the variable resistors to tune the transmitter and receiver. While usable and at times satisfactory, potentiometers are not without their drawbacks. It can be challenging to achieve desired values due to physical properties of the potentiometers and the potentiometers can function with step increments making matching difficult. To alleviate the challenges, a switched-capacitor can be used to provide variable resistance instead of a potentiometer. With the switched-capacitor, a frequency can be set to achieve a precise accurate resistance. With precise accurate resistances, the transmitter and receiver can successfully communicate with one another.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a transmitter 110 and a receiver 120. The transmitter 110 can send a chaotic signal 130, that is a chaotically modulated signal, to the receiver 120 through employment of respective antennas 140. The chaotic signal 130 contain a clean signal 150. The chaotic signal 130 is a carrier signal that the clean signal 150 is modulated onto. A modulator 160 of the transmitter 110 can process the clean signal 150 into the chaotic signal 130. In one embodiment, the modulator 160 uses a base signal generated by an oscillator to produce the chaotic signal 130. The receiver 120 can employ a demodulator 170 to process the chaotic signal 130 back into the clean signal 150.

Chaos theory is the mathematical subject matter focused on the evolving behavior of a system due to the system's high sensitivity to initial conditions. Small changes to the initial conditions of such a system causes the system to exhibit exponentially large differences in results. The transmitter 110 and receiver 120 can employ hardware components in communication such as, but not limited to, amplifiers, inductors, capacitors, and variable resistors. These hardware components can be chosen such that their values can cause the electrical parameters of the transmitter 110 and the receiver 120 to be precisely matched with one another so that the transmitter 110 and receiver 120 are able to communicate with one another. The transmitter 110 and the receiver 120 can individually be considered a chaotically modulated communication device.

The clean signal 150 can be what a user of the transmitter 110 ultimately wants communicated to the receiver 120. The modulator 160 can be configured to modulate the clean signal 150 in accordance with a modulation scheme (e.g., employ resistors to produce the chaotic signal 130). The antenna 140 of the transmitter 110 can transmit the chaotic signal 130 from the transmitter 110 and to the antenna 140 of the receiver 120. The demodulator 170 can successfully demodulate the chaotic signal 130 into the clean signal 150 (e.g., the exact clean signal 150 sent by the transmitter or a close approximation so that the two clean signals 150 in FIG. 1 are about equal).

In order to achieve this, the modulator 160 and the demodulator 170 and/or the transmitter 110 and receiver 120 can be finely tuned with one another. In order achieve this fine tuning, resistor values of the modulator 160 and demodulator 170 and/or the transmitter 110 and receiver 120 should be precise. To achieve this precision, a switched-capacitor can be used to attain specific resistor values and/or to vary a resistor value.

Figure 2:
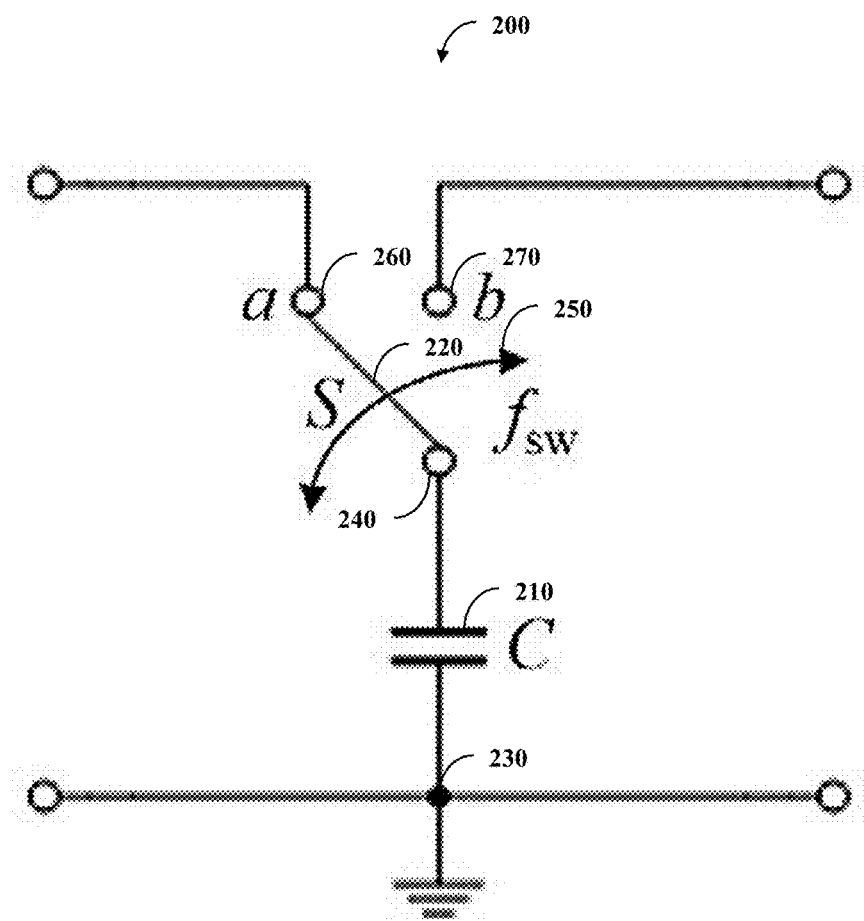
FIG. 2 illustrates one embodiment of a system that can function as a variable resistors comprising a capacitor and a switch.

FIG. 2 illustrates one embodiment of a system 200 that can function as a variable resistors comprising a capacitor 210 (with physical capacitance of a value of 'C') and a switch 220 (of a length S'). The capacitor 210 can comprise a first end 230 and a second end 240 opposite the first end 230. The switch 220 can also comprise two ends with a first end being coupled to the second end 240 of the capacitor 210 (e.g., function as the same end). The second end of the switch 220 can alternate at a frequency 250 (a switching frequency with a value of '$f_{sw}$') between at least two points 260 and 270 (at coordinates 'a' and 'b' respectively). This alternation between point 260 and point 270 can be such that the system 200 produces a resistance that corresponds to the frequency.

The following table is example capacitance values and switching frequencies that can be used to produce a resistance:

| Frequency (Hertz) | Capacitance (picofarads) | Resistance (ohms) |
|---|---|---|
| 100 | 100 | 31.108k |
| 10000 | 100 | 35.06k |
| 20000 | 100 | 39.293k |
| 30000 | 100 | 43.436k 43.441k |

-continued

| Frequency (Hertz) | Capacitance (picofarads) | Resistance (ohms) |
|---|---|---|
| 40000 | 100 | 47.739k or 47.751k |
| 50000 | 100 | 51.933k or 51.944k |
| 60000 | 100 | 56.183k or 56.199k |
| 70000 | 100 | 60.353k or 60.393k |
| 80000 | 100 | 64.493k or 64.538k |
| 90000 | 100 | 68.571k or 68.619k |
| 100000 | 100 | 72.548k or 72.601k |

Figure 3:
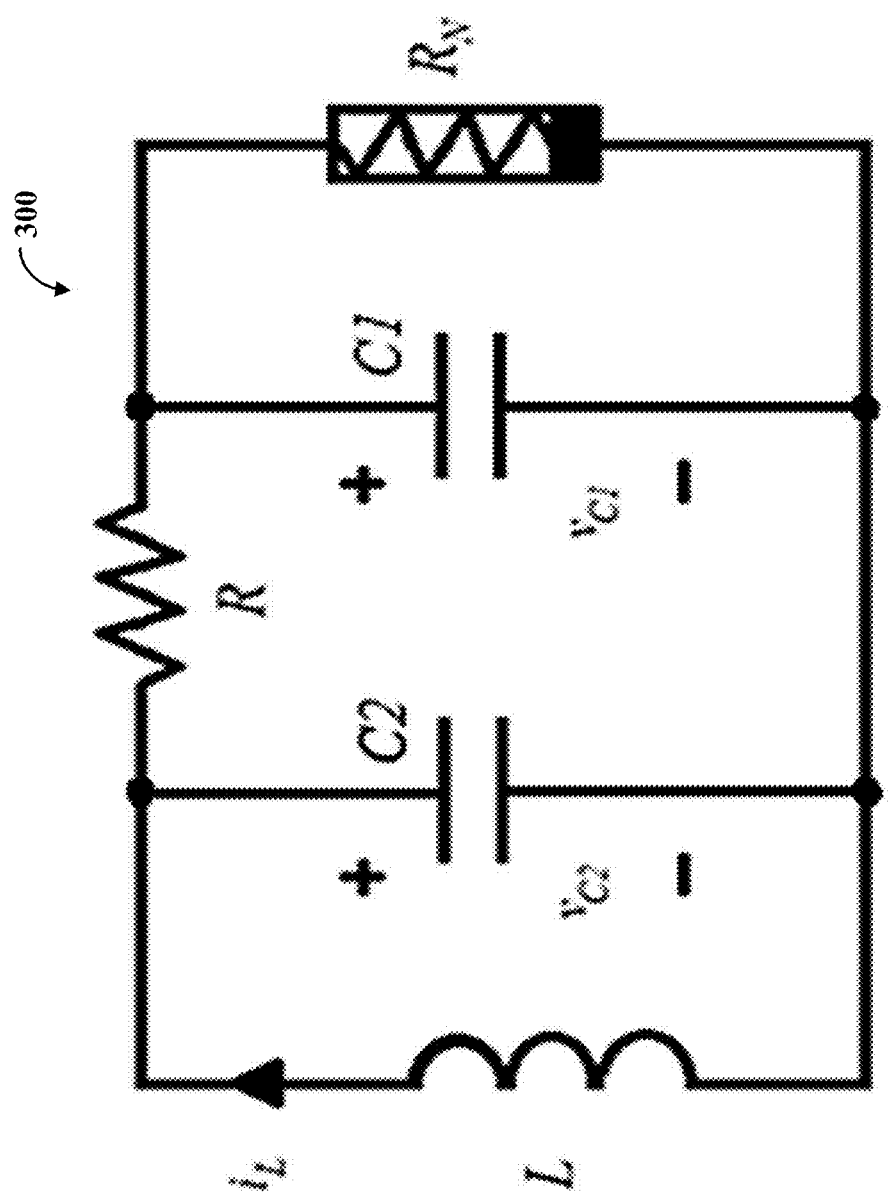
FIG. 3 illustrates a conceptual circuit diagram of Chua's circuit.

FIG. 3 illustrates a conceptual circuit diagram of Chua's circuit 300. Chua's circuit 300 can comprise four passive elements (illustrated in FIG. 3 with inductor L, resistor R, and capacitors $C_1$ and $C_2$) and a negative-resistive component $R_N$. The system 200 of FIG. 2 can be used as a variable resistor to replace the resistor R.

Figure 4:
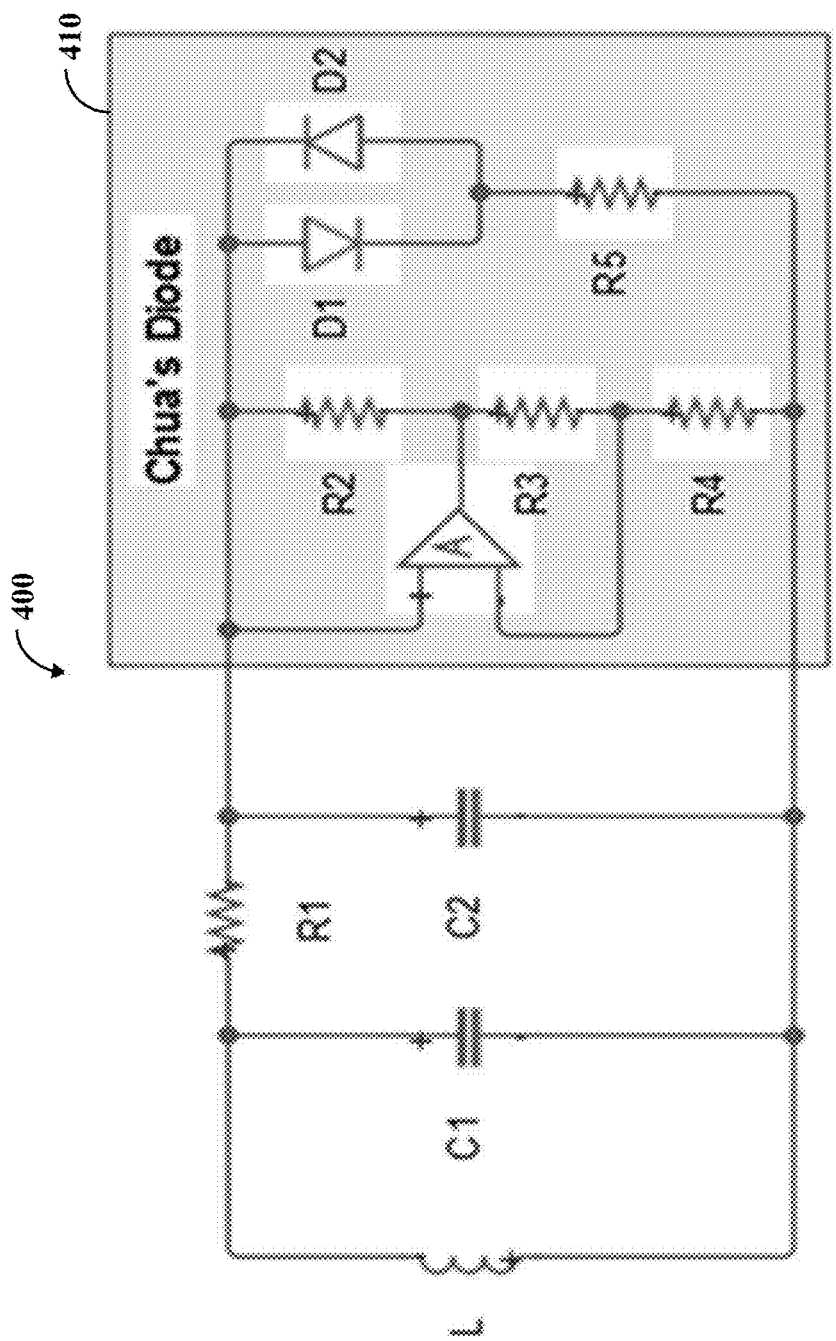
FIG. 4 illustrates one embodiment of Chua's circuit with one embodiment of Chua's diode.

FIG. 4 illustrates one embodiment of Chua's circuit 400 with one embodiment of Chua's diode 410 that implemented as the negative-resistive component $R_N$ in FIG. 3. Chua's diode 410 can be implemented with two diodes D1 and D2, an amplifier A, and four resistors R2, R3, R4, and R5. The combined orientation of these hardware components can generate a negative resistance.

Figure 5:
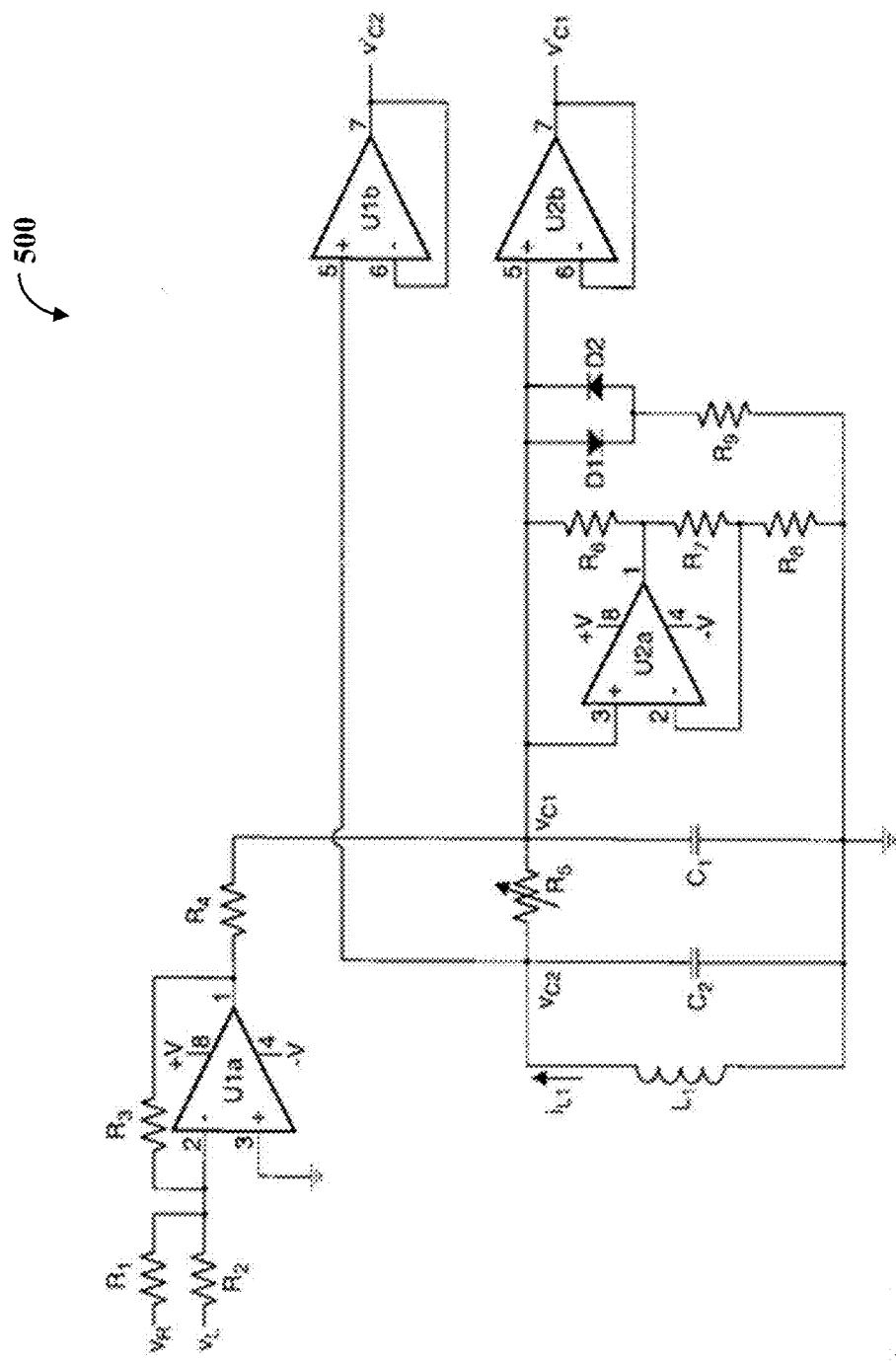
FIG. 5 illustrates one embodiment of a transmitter.

FIG. 5 illustrates one embodiment of a transmitter 500. The transmitter 500 can implement Chua's circuit 400 with the Chua's diode 410 of FIG. 4. A variable resistor $R_5$ in the transmitter 500 can be the resistance value of resistor R from Chua's circuit 300 of FIG. 3. The transmitter 500 can produce the chaotic signal 130 of FIG. 1 and therefore functions as at least part of the transmitter 110 of FIG. 1. The system 200 of FIG. 2 can be used to produce variable resistance $R_5$.

Figure 6:
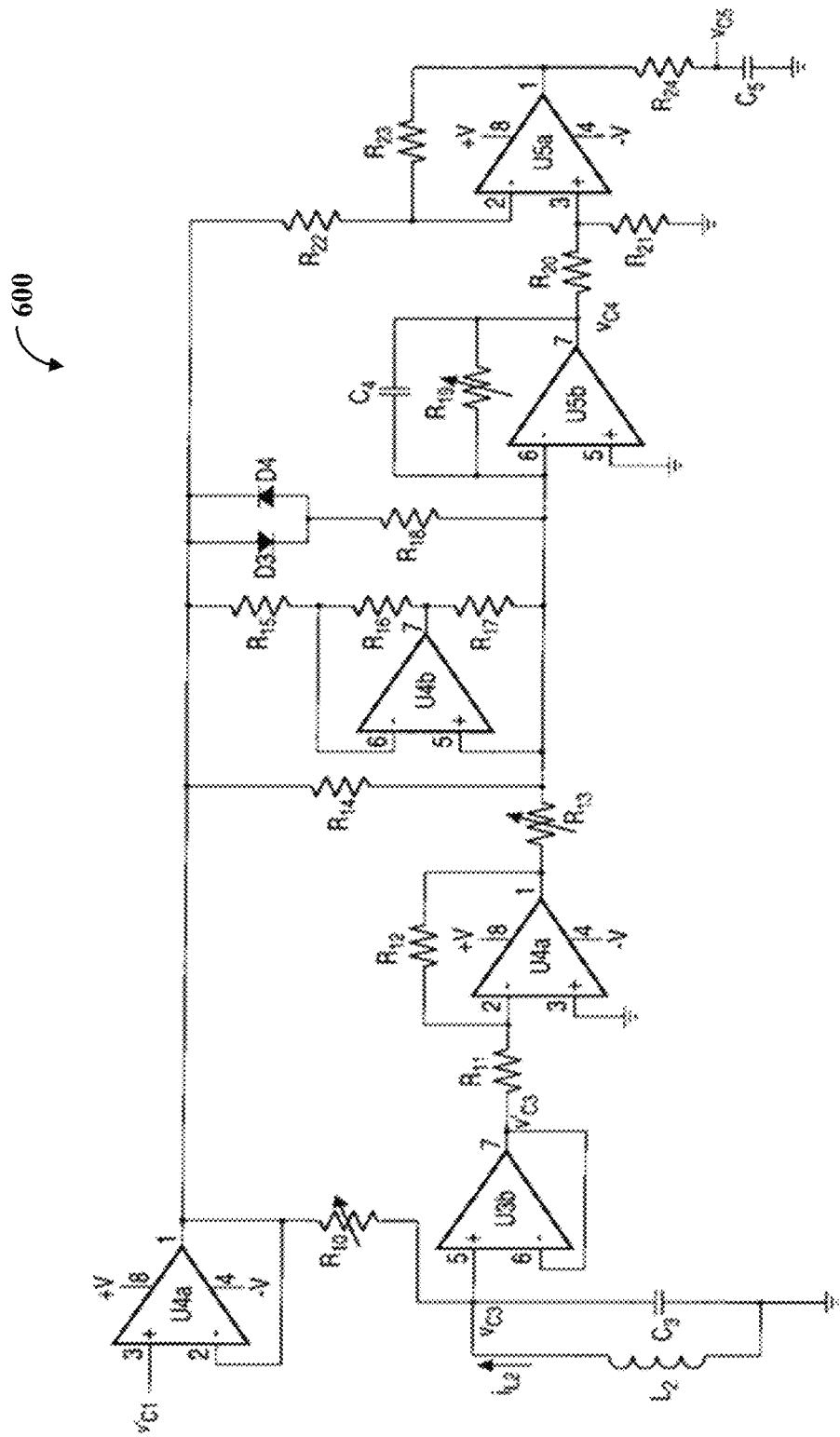
FIG. 6 illustrates one embodiment of a receiver.

FIG. 6 illustrates one embodiment of a receiver 600. The receiver 600 can implement Chua's diode 410 of FIG. 4. For the receiver 600 to synchronize with the transmitter 500, the variable resistor $R_{10}$ is set to about the same value as the variable resistor $R_5$ in the transmitter 500 of FIG. 5. However, due to imperfect values of other hardware components, the value of variable resistor $R_{10}$ can deviate slightly from the value of variable resistor $R_5$ in transmitter 500 of FIG. 5 in order to obtain synchronization. Variable resistors $R_{13}$ and $R_{19}$ of receiver 600 are used to demodulate the chaotically modulated signal 130 of FIG. 1, and in turn, receiver 600 functions as at least part of the receiver 120 of FIG. 1. The system 200 of FIG. 2 can be used to produce variable resistances with resistors $R_{10}$, $R_{13}$, and $R_{19}$.

In one embodiment, the transmitter 500 of FIG. 5 and the receiver 600, as illustrated, can be hardware-defined. With being hardware-defined, the transmitter 500 of FIG. 5 and the receiver 600 can function without software (e.g., the switching frequencies can be implemented by a separate software device, but the transmitter 500 of FIG. 5 and the receiver 600 themselves do not use software). By functioning without software, they are not able to be hacked in a conventional software sense. With that, the scheme cannot be detected through hacking and the frequencies cannot be switched by hacking a controller that is part of the transmitter 500 of FIG. 5 or the receiver 600. In one embodiment, the transmitter 500 of FIG. 5 and/or the receiver 600 can be software-defined or hardware/software-defined. Resistance values can be preset by setting appropriate switching frequencies of switched-capacitors.

Figure 7:
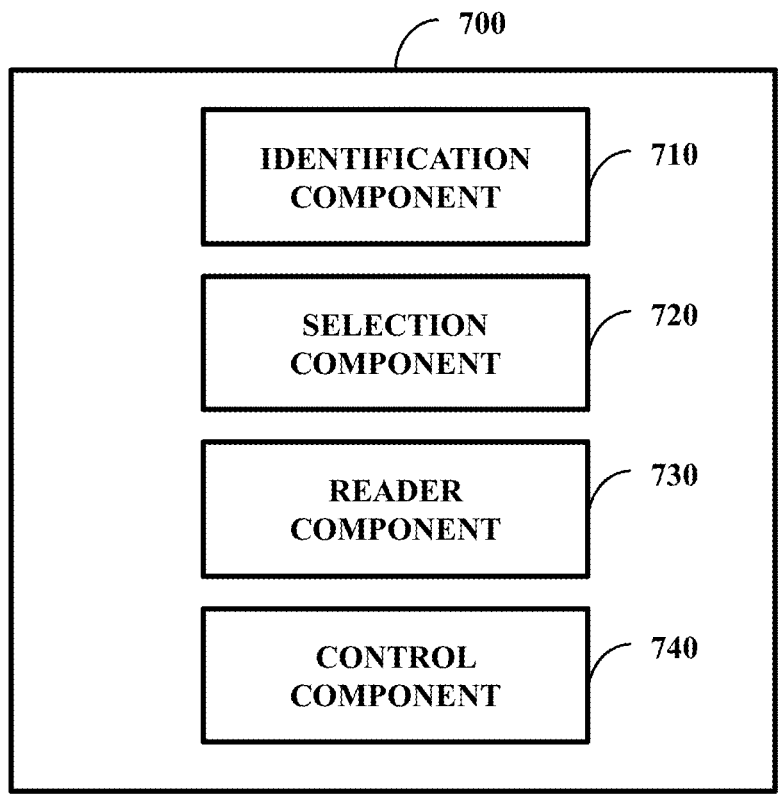
FIG. 7 illustrates one embodiment of a system comprising an identification component, a selection component, a reader component, and a control component.

FIG. 7 illustrates one embodiment of a system 700 comprising an identification component 710, a selection component 720, a reader component 730, and a control component 740. As discussed above, the transmitter 110 of FIG. 1 and/or the receiver 120 of FIG. 1 can be constructed with a variable resistance implemented by way of the system 200 of FIG. 2; the system 700 can be used to manage the variable resistance. For various reasons, such as natural drift or a re-calibration, the frequency 250 of the switch 220, both of FIG. 2, should be changed. The system 700 can manage this change.

The identification component 710 can be configured to identify a change that influences operation of the device. In one example, the transmitter 110 of FIG. 1 is paired with a different receiver than the receiver 120 of FIG. 1. In this example, the new pairing is the change.

The selection component 720 can be configured to make a selection of a new frequency for the switch 220 of FIG. 2. As an example, the frequency 250 of FIG. 2 can be set at a first frequency. The selection component 720 can select the frequency 250 of FIG. 2 to be at a second frequency. The first frequency and the second frequency are unequal and both can be non-zero numbers or one can be a non-zero number while the other is zero.

The reader component 730 can be configured to read an instruction to alter the switch 220 of FIG. 2 from the first frequency to the second frequency. Examples can include increasing the frequency or decreasing the frequency, stopping the switch, or starting the switch from a rest. The control component 740 can be configured to control the switch 220 of FIG. 2 to alternate at the second frequency such that a second resistance is produced different from the first resistance of the first frequency.

Figure 8:
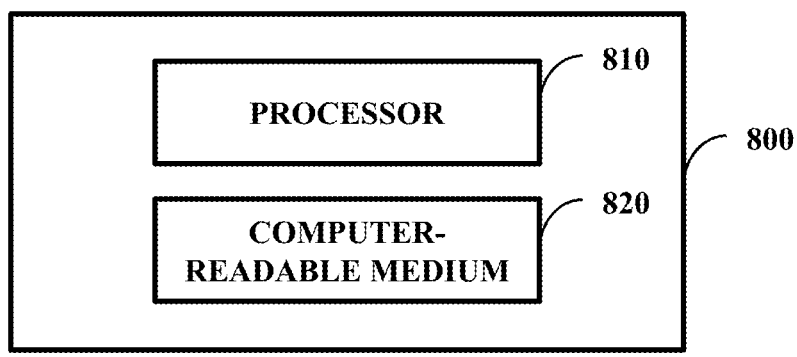
FIG. 8 illustrates one embodiment of a system comprising a processor and a computer-readable medium.

FIG. 8 illustrates one embodiment of a system 800 comprising a processor 810 (e.g., a general purpose processor or a processor specifically designed for performing a functionality disclosed herein) and a computer-readable medium 820 (e.g., non-transitory computer-readable medium). In one embodiment, a chaotically modulated communication device synchronization apparatus can employ the system 800 to synchronize one device with another. In one embodiment, a system 800 can retain at least part of a chaotically modulated communication device configuration apparatus.

In one embodiment, the computer-readable medium 820 is communicatively coupled to the processor 810 and stores a command set executable by the processor 810 to facilitate operation of at least one component disclosed herein (e.g., reader component 730 of FIG. 7). In one embodiment, at least one component disclosed herein can be implemented, at least in part, by way of non-software, such as implemented as hardware by way of the system 300 (e.g., the control component 740 of FIG. 7). In one embodiment, the computer-readable medium 820 is configured to store processor-executable instructions that when executed by the processor 810, cause the processor 810 to perform a method, that can be an example algorithm, disclosed herein (e.g., the methods 900-1500 addressed below).

Figure 9:
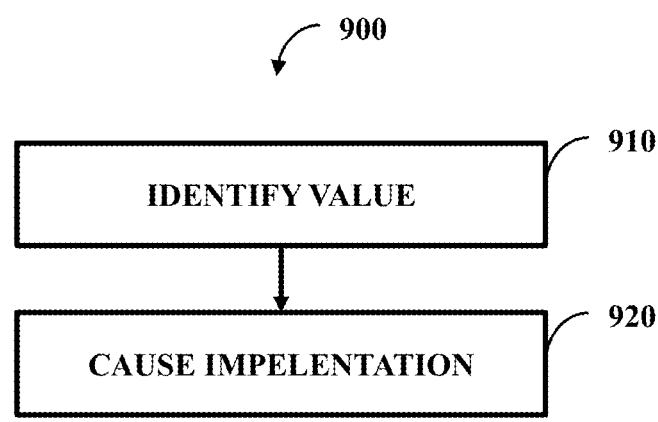
FIG. 9 illustrates one embodiment of a method comprising two actions.

FIG. 9 illustrates one embodiment of a method 900 comprising two actions 910-920. Actions 910 and 920 can be performed by a chaotically modulated communication device configuration apparatus that configures two devices to communicate with one another (e.g., transmit and receive between one another). At 910, identifying a switching frequency value for a switched-capacitor (e.g., the system 200 of FIG. 2) that is part of a first chaotically modulated communication device (e.g., the transmitter 110 of FIG. 1) can occur. Also at 910, identifying a switching frequency value for a switched-capacitor that is part of the second chaotically modulated communication device can occur.

Identifying the values can happen in tandem and be interrelated. With this, the values can be selected in conjunction with one another so that the devices are synchronized (e.g., can communicate with one another).

At 920, there can be causing a switching frequency for the switched-capacitor to be implemented with the switching frequency value such that the first chaotically modulated communication device is communicative with a specific second chaotically modulated communication device (e.g., the receiver 120 of FIG. 2). This can enable a switched-capacitor functioning as a resistor $R_1$ of the Chua's circuit 400 of FIG. 4 to be configured to cause chaotic transmission of a signal (e.g., the clean signal 150 of FIG. 1 transmitted as the chaotic signal 130 of FIG. 1).

In one embodiment, the method 900 is employed in determining initial values for the frequencies. In another embodiment, the method 900 can be used to change existing, non-zero values so that the devices are synchronized. This can occur in response to two devices that are not previously synchronized (e.g., paired) to become paired or devices to become re-synchronized after they have fallen out of synchronization (e.g., in response to an outside influence).

Figure 10:
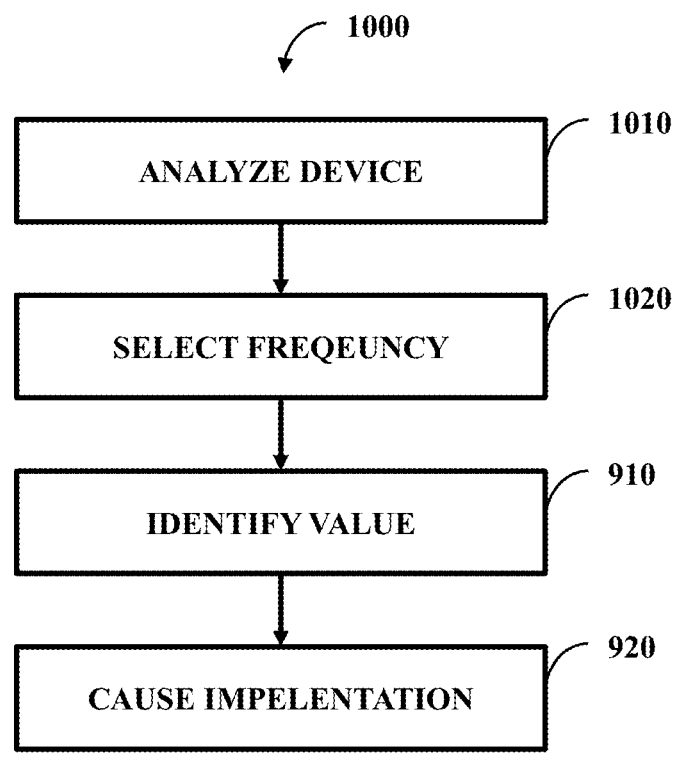
FIG. 10 illustrates one embodiment of a method comprising four actions.

FIG. 10 illustrates one embodiment of a method 1000 comprising four actions 910-920 and 1010-1020. At 1010, analyzing the second chaotically modulated communication device to determine the signal modulation scheme that is used in the selecting of the switching frequency value for the first device takes place. Based on a result of this analysis, the switching frequency value for the device can be selected at 1020. In one embodiment, the second device is configured first in time (e.g., according to an optimization arrangement) and in response to this values (e.g., optimized values) are selected for the first device. The selected value can be identified at 910 and implemented at 920.

Figure 11:
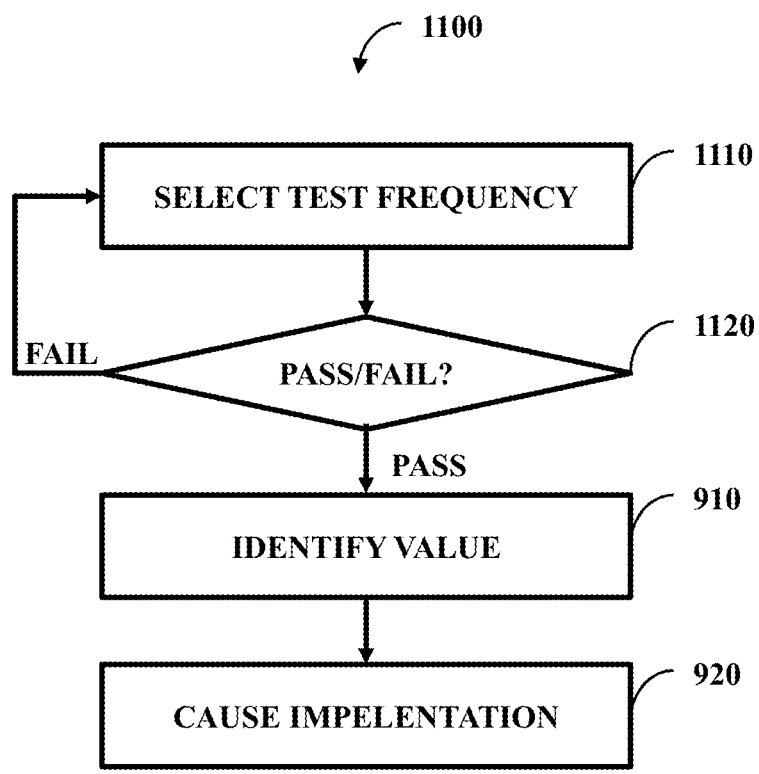
FIG. 11 illustrates one embodiment of a method comprising four actions.

FIG. 11 illustrates one embodiment of a method 1100 comprising four actions 910-920 and 1110-1120. In one embodiment, the devices are configured through a trial and error method that functions as the method 1100. At 1110, selecting a first test switching frequency value for the switched-capacitor that is part of the first chaotically modulated communication device can occur. In one embodiment, this can occur in conjunction with a test value or a set value of the second device.

At 1120, there can be testing the first test switching frequency value. This test can result in a pass (the devices can communicate with one another) or a fail (the devices cannot communicate with one another). If the testing fails, then the method can return to 1110 and a second test switching frequency is selected and tested (e.g., after a certain number of failures occur, then testing can be stopped and an error message can be generated). If the testing passes (e.g., is successful), then the first test switching frequency value is identified as the switching frequency value at 910 and is implemented at 920.

Figure 12:
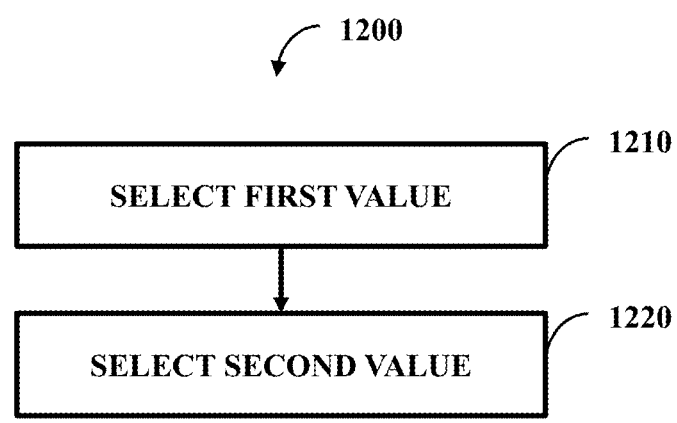
FIG. 12 illustrates one embodiment of a method comprising two actions.

FIG. 12 illustrates one embodiment of a method 1200 comprising two actions 1210-1220. Actions 1210 and 1220 can be performed by the chaotically modulated communication device synchronization apparatus. At 1210, there can be selecting a first switching value set for a switched-capacitor set of a chaotically modulated transmitter. At 1220, there can be selecting a second switching value set for a switched-capacitor set of a chaotically modulated receiver. The selection of the first switching value set and the selection of the second switching value set are such that the chaotically modulated transmitter and the chaotically modulated receiver are synchronized so that the chaotically modulated receiver is configured to successfully demodulate a modulated transmission from the chaotically modulated transmitter.

While discussed in terms of transmission and reception, the receiver can have transmission capabilities and the transmitter can have reception capabilities such that the transmitter and receiver can have bilateral communication. The receiver and the transmitter can individually employ Chua's circuits with switched-capacitors that function as variable resistors. Therefore, the chaotically modulated transmitter can be configured to successfully demodulate a modulated transmission from the chaotically modulated receiver.

Figure 13:
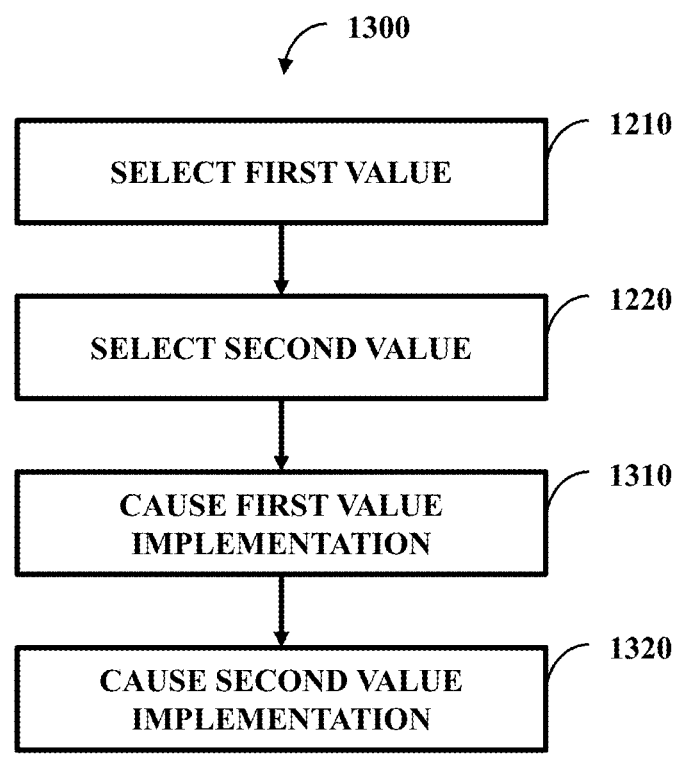
FIG. 13 illustrates one embodiment of a method comprising four actions.

FIG. 13 illustrates one embodiment of a method 1300 comprising four actions 1210-1220 and 1310-1320. At 1210 and 1220, the values can be selected. At 1310, causing the switched-capacitor set of the chaotically modulated transmitter to implement with the first switching value set can occur. At 1320, causing the switched-capacitor set of the chaotically modulated receiver to implement with the second switching value set can occur.

Figure 14:
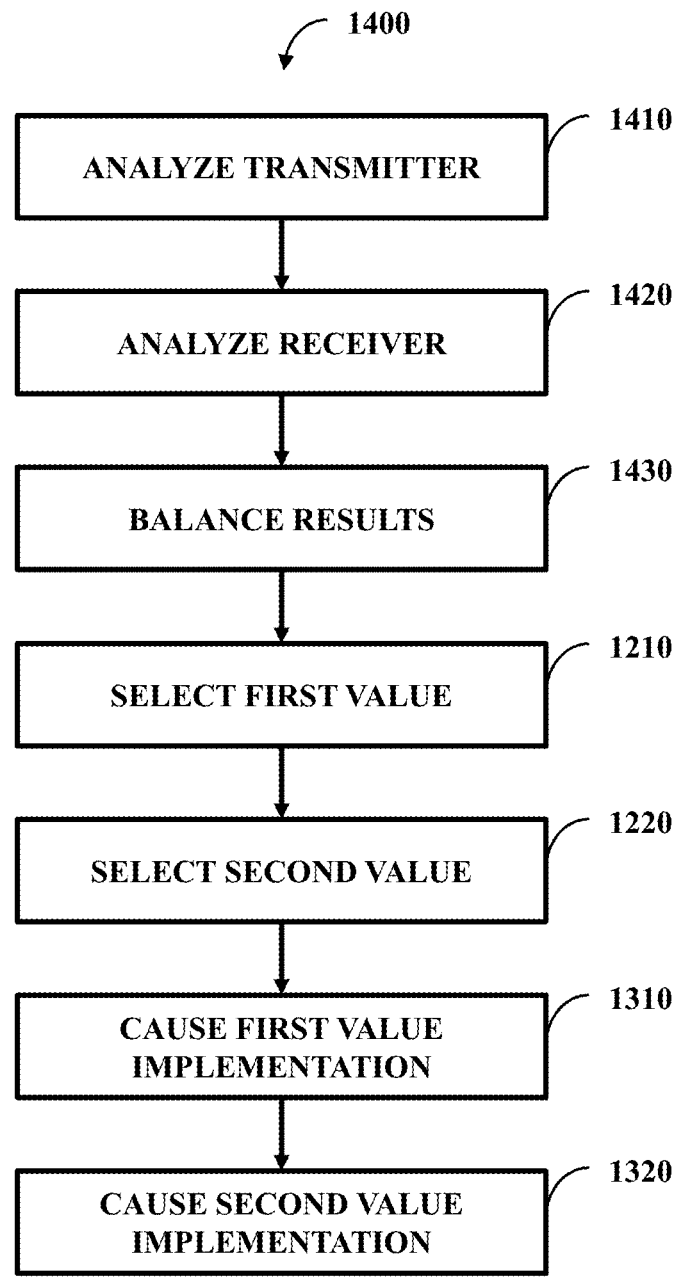
FIG. 14 illustrates one embodiment of a method comprising seven actions.

FIG. 14 illustrates one embodiment of a method 1400 comprising seven actions 1210-1220, 1310-1320, and 1410-1430. At 1410, analyzing the chaotically modulated transmitter to produce a transmitter analysis result can occur. At 1420, analyzing the chaotically modulated receiver to produce a receiver analysis result can take place. At 1430, there can be balancing the transmitter analysis result and the receiver analysis result to produce a balanced analysis result. The first switching value set and the second switching value set can be selected at 1210 and 1220, at least in part, through use of the balanced analysis result and be implemented at 1310 and 1320.

Various switching frequency combinations can be acceptable for the transmitter and receiver, but determining the combination to use can be challenging. In one example, different values can be beneficial for the receiver or transmitter, but not work together. As an example, it can be desirable for the value to be as low as possible under the premise that the lower the frequency, the less physical wear and therefore greater longevity. The method 1400 can balance the interests of the different devices to decide the values.

Figure 15:
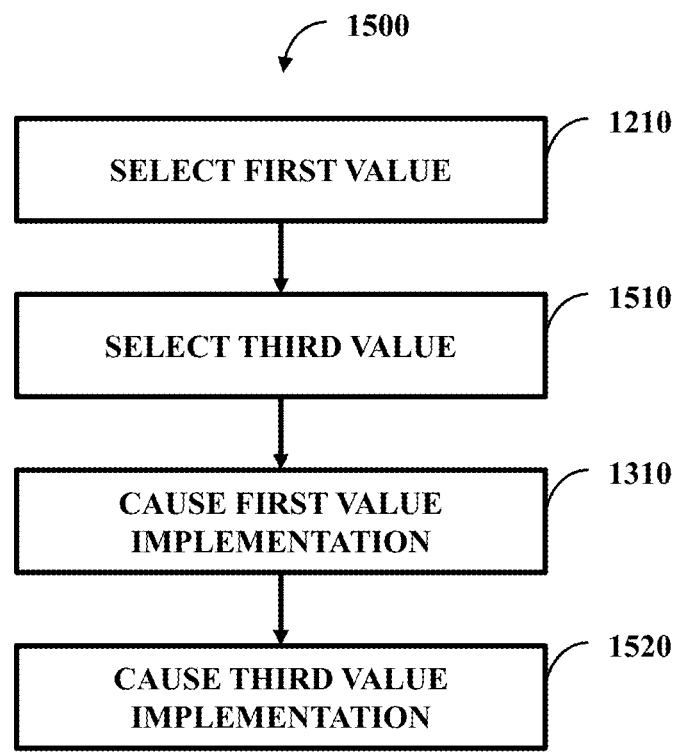
FIG. 15 illustrates one embodiment of a method comprising four actions.

FIG. 15 illustrates one embodiment of a method 1500 comprising four actions 1210, 1310, and 1510-1520. In one embodiment, one receiver can communicate with more than one transmitter. This can be achieved in multiple manners. In one manner, the receiver and two transmitters are finely tuned so communication is possible with a single set of values. In another manner, the receiver includes a toggle switch. The toggle switch can cause selection between a first transmitter and a second transmitter. When the toggle switch is at the first transmitter, then the switched-capacitor set has the first value set. When the toggle switch is at the second transmitter, then the switched-capacitor set has the second value set. This can enable the receiver to communicate with two different transmitters.

At 1210 the first value is selected and at 1510, there is selecting a third switching value set for the switched-capacitor set of the chaotically modulated receiver. At 1510 and 1520, implementation of the values can occur (e.g., be loaded onto a non-transitory computer readable medium associated with the receiver). This can enable the chaotically modulated receiver to be synchronized with the second chaotically modulated transmitter so that the chaotically modulated receiver is configured to successfully demodulate a modulated transmission from the second chaotically modulated transmitter.

In one embodiment, the chaotically modulated receiver functions without a toggle switch. The transmission can include a header. The header can identify a transmitter from which that transmission emanates. Based on this header, the chaotically modulated receiver can set the appropriate values.

Figure 16:
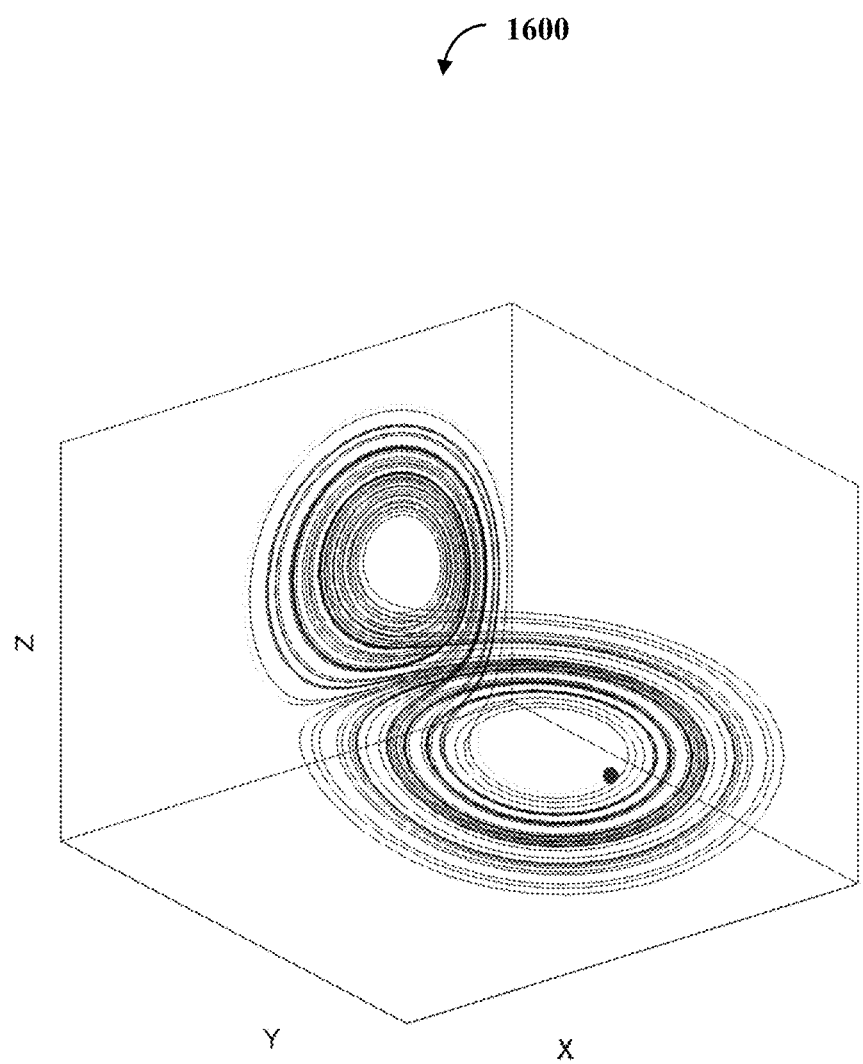
FIG. 16 illustrates one embodiment of a phase space plot of a Lorenz attractor.

FIG. 16 illustrates one embodiment of a phase space plot 1600 of a Lorenz attractor. Attractors can be used, in one embodiment, to characterize the chaotic behavior of a hardware-defined secure communication system. An example hardware-defined communication system can be the transmitter 500 of FIG. 5 and the receiver 600 of FIG. 6 with variable resistors implemented by the system 200 of FIG. 2 functioning as a chaotically modulated transmitter-receiver system. This can achieve simple, accurate, flexible, and repeatable adjustment of the electrical settings of a chaotically modulated transmitter-receiver system. In chaotic modulation, the message signal is modulated on to a chaotic waveform generated from a chaotic oscillator (e.g., Chua's circuit 300 of FIG. 3), which is then transmitted through a communications channel. In order for the signal to be demodulated (e.g., removal of the chaotic nature of the signal)—so that the signal can be interpreted—several adjustable system settings can used, such as adjustment of variable resistors as discussed above. These settings are adjusted to precise values; otherwise, the signal is not demodulated.

Dynamic systems that are highly sensitive to small perturbations in the initial conditions can be classified as chaotic systems. What can be considered negligible differences between sets of initial conditions can result in exponentially large differences between outputs. These systems are nonlinear and non-periodic. It is a common misconception that chaos implies randomness. Random systems are non-deterministic; the output will vary for the same input. Chaotic systems are deterministic when the initial conditions are about exactly identical; they are not deterministic when the initial conditions are about approximately identical.

A phase space plot 1600 can give a great amount of insight to the evolving behavior of a dynamic system. The geometric object that is plotted in the phase space is a graphical representation of a dynamic system to a set of initial conditions over time. For a possible state in the system, there can a unique point representing that state in space. A degree of freedom (independent variable necessary to determine the state of a dynamic system) of the system is an axis in a multi-dimensional space, and the plotting of a state at a point in time is determined by the degree of freedom(s) at that time.

An attractor can be a set of values a dynamic system is evolving towards for a given set of initial conditions. In systems that exhibit attracting behavior, initial states can evolve towards a final state or set of final states. There are many types of attractors, but the attractors for chaotic systems can be considered chaotic attractors. An example of such a system would be the Lorenz system: a third-order set of ordinary differential equations modeling atmospheric convection. Example equations can be:

$$\frac{dX}{dt} = \sigma(Y - X) \quad (1)$$

$$\frac{dY}{dt} = \rho X - Y - XZ \quad (2)$$

$$\frac{dZ}{dt} = XY - \beta Z \quad (3)$$

In one example, X, Y, and Z are the three states of the system. The plot 1600 can be the Lorenz attractor plotted in a phase space where $\sigma=10$, $\rho=28$, and $\beta=8/3$.

To characterize an attractor as chaotic, two conditions can be: (a) the attractor has fractal dimension and (b) the largest Lyapunov exponent from a set of Lyapunov exponents, known as a Lyapunov spectrum, is be greater than zero. A geometric object has fractal dimension if the dimension it exists in is a non-integer. Lyapunov exponents can be used as a metric for a dynamic system's sensitivity to initial conditions.

Figure 17:
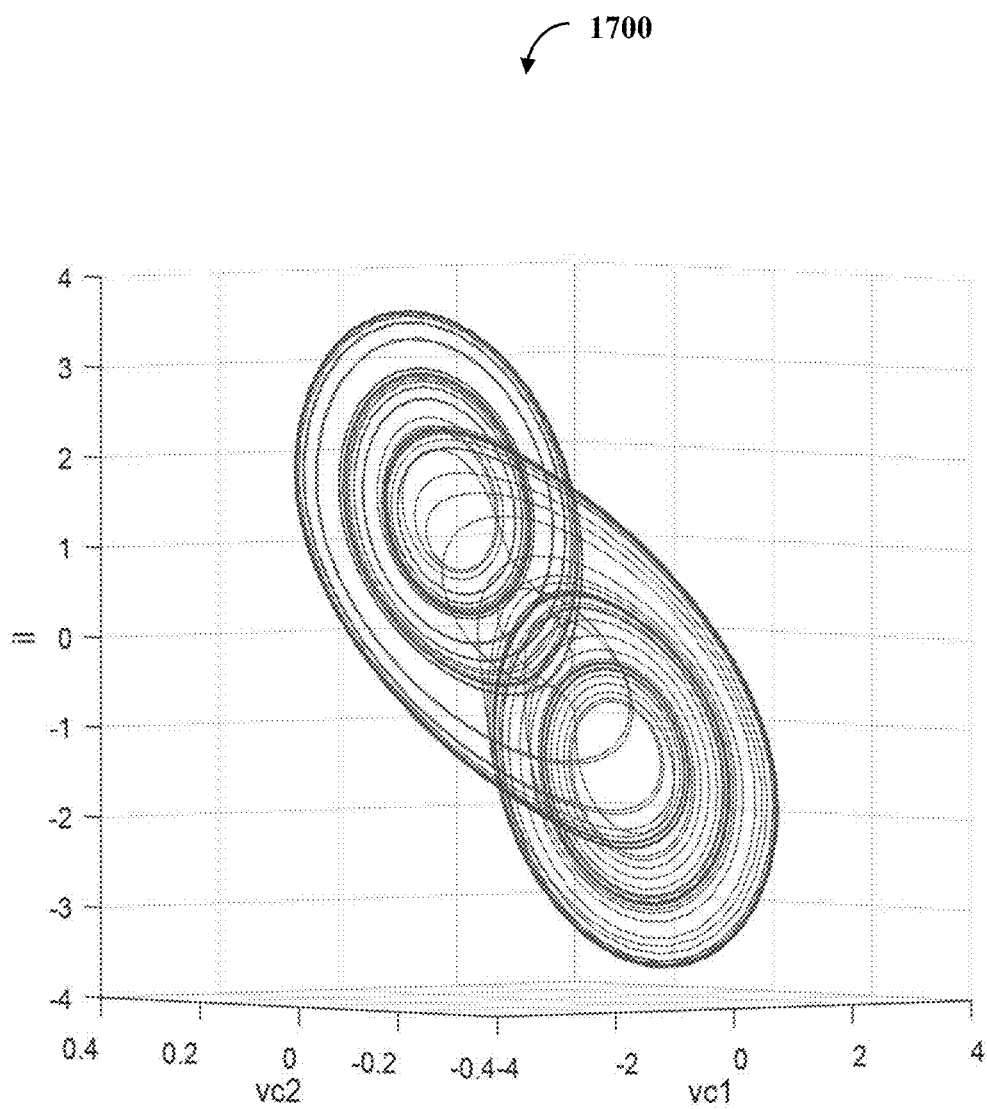
FIG. 17 illustrates one embodiment of a double-scroll attractor.

FIG. 17 illustrates one embodiment of a double-scroll attractor 1700 that can be generated by the Chua's circuit 300 of FIG. 3. The Chua's circuit 300 of FIG. 3 demonstrates chaotic behavior. The Chua's circuit 300 of FIG. 3 is an electrical dynamic system which generates a chaotic attractor known as a double-scroll attractor.

Physically, the Chua's circuit 300 of FIG. 3 is a non-periodic oscillator—an oscillator that never repeats. By Kirchhoff's law, Chua's circuit 300 of FIG. 3 is represented by the following differential equations:

$$C_1 \frac{dv_{C_1}}{dt} = \frac{1}{R}(v_{C_2} - v_{C_1}) - f(v_{C_1}) \quad (4)$$

$$C_2 \frac{dv_{C_2}}{dt} = \frac{1}{R}(v_{C_1} - v_{C_2}) + i_L \quad (5)$$

$$L \frac{di_L}{dt} = -v_{C_2} \quad (6)$$

where $v_{C_1}$ is the voltage across capacitor $C_1$ and $R_N$, $v_{C_2}$ is the voltage across capacitor $C_2$, $i_L$ is the current through inductor L, and R is a linear resistor.

$R_N$ of the Chua's circuit 300 of FIG. 3 can be manufactured as a multiple circuit element. Various combinational designs can be used to implement $R_N$. In one example, two operational amplifiers (op-amps) and six resistors can be used. In another example, four resistors, two diodes, and an op-amp can be used as illustrated with the Chua's diode 410 of FIG. 4.

Figure 18:
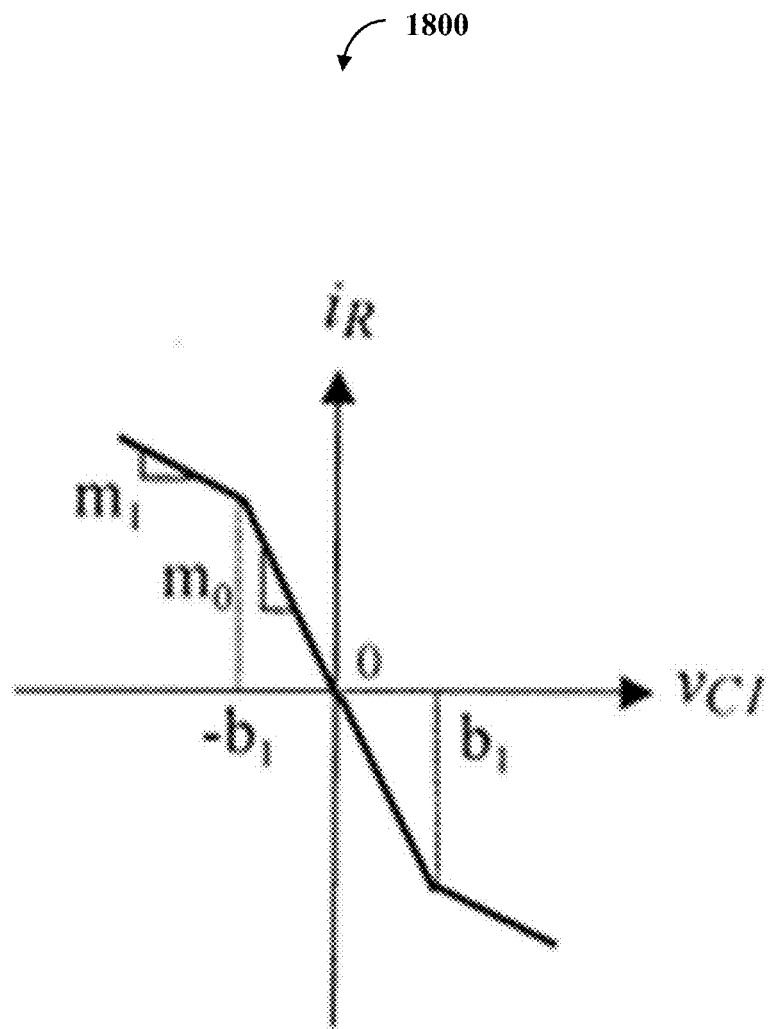
FIG. 18 illustrates one embodiment of a current-voltage curve.

FIG. 18 illustrates one embodiment of a current-voltage curve 1800 for the resistor $R_N$ in the Chua's circuit 300 of FIG. 3. A current-voltage characteristic equation for the resistor $R_N$ in the Chua's circuit of FIG. 3 that produces the curve 1800 can be:

$$f(v_{C_1}) = m_1 v_{C_1} + \frac{1}{2}(m_0 - m_1)(|v_{C_1} + b_1| - |v_{C_1} - b_1|) \quad (7)$$

This is a 3-segment piecewise function where $m_0$ and $m_1$ are the slopes and $-b_1$ and $b_1$ are the breakpoints.

There are different synchronization methods that can be used to synchronize and configure the transmitter 500 of FIG. 5 and the receiver 600 of FIG. 6. On such method that can be used is identical drive-response synchronization. The transmitter 500 of FIG. 5 (which can be referred to as a drive system) and the receiver 600 of FIG. 6 (which can be referred to as a response system) can have identical chaotic systems. The systems can synchronize for any initial condition as long as they are coupled by a shared chaotic signal (which can be referred to as a drive signal). The signal 130 of FIG. 1 can be considered a drive signal. In one example, the drive signal is employed in the method 900 of FIG. 9. In one example, identifying the drive signal is action 910 of FIG. 9 and using the drive signal to synchronize is action 920 of FIG. 9.

For synchronization to occur between the chaotic systems, the Lyapunov exponents for the receiver can be negative. Negative Lyapunov exponents indicate that the displacement between the trajectories of the orbits from the two chaotic systems will decrease. Therefore, the transmitter 500 of FIG. 5 and the receiver 600 of FIG. 6 achieve synchronization.

There are many different techniques that can be used to transmit signals in a chaotic-based secure communications (CBSC) system. One example technique that can be used is chaotic parameter modulation (CPM), in which the message signal (e.g., the clean signal 150 of FIG. 1) is used to modulate a parameter of the chaotic oscillator in the transmitter 500 of FIG. 5. In an example of operation of synchronization, the drive signal is sent to the receiver 600 of FIG. 6. This modulated parameter allows a synchronization error to be detected between the drive signal reaching the receiver 600 of FIG. 6 and a self-generated chaotic signal within the receiver 600 of FIG. 6 (e.g., subsystems of the receiver 600 of FIG. 6). This comparison allows the original message signal to be retrieved. Noise in the channel can cause perturbations which would disrupt the receiver's ability to synchronize with the chaotically modulated signal.

For the transmitter 500 of FIG. 5 and the receiver 600 of FIG. 6 to operate as a functional communication system, then they should be synchronized; that is, the electrical settings of the two circuits should be tunable such that their chaotic oscillators are about identical. Due to variations in manufacturing tolerances, changes in temperature, and practical requirements for repeatability and rapid adjustment, it is desirable to find a different way to vary the resistances besides potentiometers. Switched-capacitance resistance tuning is a practical alternative. This can be achieved with the system 200 of FIG. 2.

A capacitor, switched rapidly between two points, behaves like a resistor between those two points. The value of this resistance can be adjusted according to the equation, $$R = \frac{1}{f_{sw}C} \quad (8)$$

where R is the effective resistance that is observed between points a and b (e.g., points 260 and 270 of FIG. 2); $f_{sw}$ is the switching frequency—that is, the frequency with which switch S is moved between points a and b; and C is the physical capacitance.

If C is fixed, then the value of R can be varied by changing the switching frequency, $f_{sw}$. So, the end result is a variable resistance controlled by the switching frequency $f_{sw}$. An advantage of this method is the finer granularity of resistance tuning that can be obtained. If a tunable switching circuit or oscillator (e.g., a voltage-controlled oscillator) is used, then the resistance could be varied with high precision. The precision offered by this method would be higher than the precision obtained with digital potentiometers, which have predefined step-resistance increments. Between these step increments, specific resistance values are not able to be selected.

With C is fixed, the physical capacitance in the circuit can be replaced with another, whose capacitance is different. After the replacement, the new value of capacitance remains fixed in the circuit. This has the effect of changing the overall tuning range of this variable resistor.

An historic problem with potentiometers is their tendency to drift from their desired value as a function of temperature, or their wide-ranging values of component tolerances. In many applications, this is not a major concern—but in applications where a high degree of precision is required, this is an important problem to consider. Chaotic communication systems is one such application where a high degree of precision can be required.

As a specific example, suppose that a user sets a potentiometer to 2,000 Ohm (2 kΩ). Temperature fluctuations in the potentiometer's immediate environment may cause the value to increase or decrease from this value, depending on the material comprising the potentiometer. By using switched-capacitance resistors instead, the precision and stability of the resistance value depends on the precision and stability of the switching circuit or oscillator.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A chaotically modulated communication device, comprising:
    a capacitor comprising a first end and a second end opposite the first end; and
    a switch comprising a first end and a second end;
    an antenna configured to receive, from a chaotically modulated transmitter, a signal modulated with a modulation scheme; and
    a demodulator component configured to successfully demodulate the signal,
    where the first end of the switch is coupled to the first end of the capacitor,
    where the second end of the switch alternates at a frequency between at least two points such that a resistance is produced,
    where the resistance corresponds to the frequency,
    where the capacitor and the switch are part of the demodulator component,
    where the frequency is set to a value so that the demodulator component successfully demodulates the signal, and
    where successful demodulation of the signal is when the signal after demodulation is about equal to a signal transmitted by the chaotically modulated transmitter prior to modulation by the chaotically modulated transmitter.

2. The chaotically modulated communication device of claim 1, comprising:
    a modulator component configured to chaotically modulate a second signal in accordance with a second modulation scheme,
    where the antenna is configured to transmit the modulated clean second signal modulated with the second modulation scheme to a chaotically modulated receiver and
    where the second signal is different from the signal received by the antenna.

3. The chaotically modulated communication device of claim 2, comprising:
a Chua's circuit configured to cause transmission of a chaotically modulated signal.

4. The chaotically modulated communication device of claim 2,
where chaotically modulated receiver and the chaotically modulated transmitter are the same device.

5. The chaotically modulated communication device of claim 2,
where chaotically modulated receiver and the chaotically modulated transmitter are not the same device.

6. The chaotically modulated communication device of claim 1, where the frequency is a first frequency and the resistance is a first resistance, the device comprising:
a reader component configured to read an instruction to alter the switch from the first frequency to a second frequency; and
a control component configured to control the switch to alternate at the second frequency such that a second resistance is produced.

7. The chaotically modulated communication device of claim 6,
where the first frequency is non-zero number and
where the second frequency is a non-zero number.

8. The chaotically modulated communication device of claim 6, comprising:
an identification component configured to identify a change that influences operation of the device; and
a selection component configured to make a selection of the second frequency based, at least in part, on the change,
where the instruction communicates the selection.

9. A method performed, at least in part, by a first chaotically modulated communication device configuration apparatus, the method comprising:
identifying a switching frequency value for a switched-capacitor that is part of the first chaotically modulated communication device;
causing a switching frequency for the switched-capacitor to be implemented with the switching frequency value such that the first chaotically modulated communication device is communicative with a specific second chaotically modulated communication device; and
identifying a switching frequency value for a switched-capacitor that is part of the second chaotically modulated communication device,
where identifying the switching frequency value for the switched-capacitor that is part of the second chaotically modulated communication device is done in conjunction with identifying the switching frequency value for the switched-capacitor that is part of the first chaotically modulated communication device so that the first chaotically modulated communication device and the second chaotically modulated communication device are synchronized and
where being synchronized causes the first chaotically modulated communication device and the second chaotically modulated communication device to communicate with one another despite their chaotic nature.

10. The method of claim 9, comprising:
selecting the switching frequency value based, at least in part, on a signal modulation scheme of the second chaotically modulated communication device.

11. The method of claim 10, comprising:
analyzing the second chaotically modulated communication device to determine the signal modulation scheme that is used in the selecting of the switching frequency value.

12. The method of claim 9,
where the switched-capacitor functions as a resistor of a Chua's circuit configured to cause chaotic transmission of a signal.

13. The method of claim 9,
where the switching frequency value is a replacement switching frequency value that replaces a non-zero switching frequency value.

14. The method of claim 9, comprising:
selecting a first test switching frequency value for the switched-capacitor that is part of the first chaotically modulated communication device; and
testing the first test switching frequency value,
where if the testing fails, then a second test switching frequency is selected and tested,
where if the testing passes, then the first test switching frequency value is identified as the switching frequency value,
where the testing fails when the first chaotically modulated communication device is not communicative with the second chaotically modulated communication device, and
where the testing passes when the first chaotically modulated communication device is communicative with the second chaotically modulated communication device.

15. A method, performed, at least in part, by a chaotically modulated communication device synchronization apparatus, the method comprising:
selecting a first switching value set for a switched-capacitor set of a chaotically modulated transmitter; and
selecting a second switching value set for a switched-capacitor set of a chaotically modulated receiver,
where the selection of the first switching value set and the selection of the second switching value set are such that the chaotically modulated transmitter and the chaotically modulated receiver are synchronized so that the chaotically modulated receiver is configured to successfully demodulate a modulated transmission from the chaotically modulated transmitter.

16. The method of claim 15, comprising:
causing the switched-capacitor set of the chaotically modulated transmitter to implement with the first switching value set; and
causing the switched-capacitor set of the chaotically modulated receiver to implement with the second switching value set.

17. The method of claim 15, comprising
where the selection of the first switching value set and the selection of the second switching value set are such that the chaotically modulated transmitter and the chaotically modulated receiver are synchronized such that the chaotically modulated transmitter is configured to successfully demodulate a modulated transmission from the chaotically modulated receiver.

18. The method of claim 15, comprising:
selecting a third switching value set for the switched-capacitor set of the chaotically modulated receiver,
where the chaotically modulated transmitter is a first chaotically modulated transmitter and
where the selection of the third switching value set is such that a second chaotically modulated transmitter and the chaotically modulated receiver are synchronized so that the chaotically modulated receiver is configured to successfully demodulate a modulated transmission from the second chaotically modulated transmitter.

19. The method of claim 15,
where the chaotically modulated transmitter employs a first Chua's circuit to produce the modulated transmission,
where the switched-capacitor set of the chaotically modulated transmitter is part of the first Chua's circuit,
where the chaotically modulated receiver employs a second Chua's circuit to demodulate the modulated transmission, and
where the switched-capacitor set of the chaotically modulated receiver is part of the second Chua's circuit.

20. The method of claim 15, comprising:
analyzing the chaotically modulated transmitter to produce a transmitter analysis result;
analyzing the chaotically modulated receiver to produce a receiver analysis result;
balancing the transmitter analysis result and the receiver analysis result to produce a balanced analysis result,
where the first switching value set is selected, at least in part, through use of the balanced analysis result and
where the second switching value set is selected, at least in part, through use of the balanced analysis result.

* * * * *